(12) United States Patent
Burgess et al.

(10) Patent No.: US 9,262,123 B2
(45) Date of Patent: Feb. 16, 2016

(54) DATA PROCESSING APPARATUS AND METHOD FOR PERFORMING A NARROWING-AND-ROUNDING ARITHMETIC OPERATION

(71) Applicant: ARM LIMITED, Cambridge (GB)

(72) Inventors: Neil Burgess, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 379 days.

(21) Appl. No.: 13/955,324

(22) Filed: Jul. 31, 2013

(65) Prior Publication Data
US 2015/0039665 A1   Feb. 5, 2015

(51) Int. Cl.
*G06F 7/50*   (2006.01)
*G06F 7/499*  (2006.01)
*G06F 7/506*  (2006.01)

(52) U.S. Cl.
CPC .............. *G06F 7/49947* (2013.01); *G06F 7/50* (2013.01); *G06F 7/506* (2013.01)

(58) Field of Classification Search
CPC combination set(s) only.
See application file for complete search history.

(56) References Cited

U.S. PATENT DOCUMENTS

2003/0001613 A1*   1/2003   Nakaya ................... G06F 7/501
                                                    326/38

* cited by examiner

*Primary Examiner* — Chuong D Ngo
*Assistant Examiner* — Calvin M Brien
(74) *Attorney, Agent, or Firm* — Nixon & Vanderhye P.C.

(57) ABSTRACT

A processing apparatus supports a narrowing-and-rounding arithmetic operation which generates, in response to two operands each comprising at least one W-bit data element, a result value comprising at least one X-bit result data element, with each X-bit result data element representing a sum or difference of corresponding W-bit data elements of the two operands rounded to an X-bit value (W>X). The arithmetic operation is implemented using a number of N-bit additions (N<W), with carry values from a first stage of N-bit additions being added at a second stage of N-bit additions for adding a rounding value to the result of the first stage additions. This technique reduces the amount of time required for performing the narrowing-and-rounding arithmetic operation.

21 Claims, 5 Drawing Sheets

DATA PROCESSING APPARATUS AND METHOD FOR PERFORMING A NARROWING-AND-ROUNDING ARITHMETIC OPERATION

TECHNICAL FIELD

The present invention relates to the field of data processing. More particularly, the invention relates to a data processing apparatus and method for performing a narrowing-and-rounding arithmetic operation.

TECHNICAL BACKGROUND

A data processing apparatus may perform a narrowing-and-rounding arithmetic operation in which two data values are added or subtracted and the result of the addition or subtraction is rounded to yield a data value having fewer bits that the original data values. The present technique seeks to speed up implementation of such an operation.

SUMMARY OF THE INVENTION

Viewed from one aspect, the present invention provides a data processing apparatus comprising:
 processing circuitry configured to process data; and
 control circuitry configured to control said processing circuitry to perform a narrowing-and-rounding arithmetic operation in response to a narrowing-and-rounding arithmetic instruction identifying two operands each comprising at least one W-bit data element, said narrowing-and-rounding arithmetic operation generating a result value comprising at least one X-bit result data element, each X-bit result data element representing a sum or difference of corresponding W-bit data elements of said two operands rounded to an X-bit value, where W and X are integers and W>X;
 wherein said control circuitry is configured to control said processing circuitry to generate each X-bit result data element of said result value by:
 (a) performing a plurality of N-bit first stage additions to generate respective N-bit intermediate values by adding or subtracting N-bit portions of said corresponding W-bit data elements, where W=J*N and J>1 and N and J are integers;
 (b) performing one or more N-bit second stage additions, each second stage addition for converting the N-bit intermediate value generated by a corresponding first stage addition into an N-bit rounded result portion of said X-bit result data element by adding a rounding value and a carry value representing a carry output of a preceding first stage addition for adding less significant N-bit portions of said corresponding W-bit data elements than said corresponding first stage addition; and
 (c) forming said X-bit result data element from the N-bit result portion generated by at least one of said one or more N-bit second stage additions.

The narrowing-and-rounding arithmetic operation generates a result value by adding or subtracting corresponding W-bit values and rounding the result to an X-bit value, where W>X. One way of implementing this operation might be to perform a W-bit addition or subtraction and then perform an X-bit addition to add a rounding value to the upper X bits of the result of the W-bit addition or subtraction. However, W may be large (e.g. 32 or 64), and even for relatively low values of W (e.g. 16), performing a W-bit addition can take a long time, because each successive bit of the addition cannot be calculated until the preceding bit has been calculated and it has been determined whether or not there is a carry from the preceding bit. As carries may ripple all the way through from the least significant bit to the most significant bit, performing the W-bit addition can take a long time. Therefore, this implementation of the narrowing-and-rounding arithmetic operation would be slow.

To address this problem, the present technique splits the W-bit addition into a number of N-bit first stage additions which each generate respective N-bit intermediate values by adding or subtracting N-bit portions of the corresponding W-bit data elements of the two operands. The carry values, which would have passed between respective N-bit portions of the sum if a W-bit addition was performed, are not added in the first stage additions. This means that the respective N-bit first stage additions can be performed in parallel with one another as it is not necessary to wait for the carry output of one of the first stage additions before performing another first stage addition. Therefore, the narrowing-and-rounding arithmetic operation can be performed more quickly. As the carry bits between respective N-bit first stage additions are not added by the first stage additions, the N-bit intermediate values do not represent portions of the true sum or difference of the corresponding W-bit data elements. However, the inventors recognised that this is not a problem because rounding the N-bit sum or difference to an X-bit value may be performed by adding a rounding value, and so a second stage of addition may already be required for rounding. Any carry values from the first stage additions can be added at the same time as the rounding value in at least one N-bit second stage addition. Each second stage addition may add the N-bit intermediate value from a corresponding first stage addition to a rounding value and a carry value representing the carry output of a preceding N-bit first stage addition. The X-bit result data element can then be formed from an N-bit result portion generated by one or more second stage additions. In this way, the critical timing path through the processing circuitry for performing the narrowing-and-rounding arithmetic operation can be reduced. Even when W is large (e.g. 32 or 64 bits), the addition can still be performed using a number of N-bit first and second stage additions (e.g. where N=8), allowing increased parallelism and therefore reducing the time required for performing the operation.

The performance improvement provided by splitting the W-bit operation into a number of N-bit chunks may allow the processing circuitry to perform the narrowing-and-rounding arithmetic operation in a single processing cycle. In contrast, if full W-bit additions had been performed then this may not have been possible.

In general, the input data element size W may be any value greater than the output data element size X. However, in practice the data element size W would often be a power of two (8, 16, 32, 64, etc), and W would typically be a power of two multiple of N (i.e. $J=2^Z$, where $Z \geq 1$).

Also, X may have any value less than W. The implementation of the operation may be more efficient if X is also a multiple of N. Often, the result would be rounded to a data element half the size of the original data element, i.e. X=W/2. Some examples of the processing circuitry may be able to round to arbitrary sizes of the result data element, while other forms of processing circuitry may be restricted to rounding only to a particular size, e.g. W/2-bit data elements.

The narrowing-and-rounding arithmetic instruction may have different forms, including a narrowing-and-rounding add instruction and narrowing-and-rounding subtract instruction. In response to the add instruction the control circuitry may control the first stage additions to add the N-bit portions of corresponding W-bit data elements, and in response to the subtract instruction the N-bit portions may be subtracted at the first stage additions.

One way of implementing the narrowing-and-rounding subtraction operation may be to form the two's complement of one of the W-bit data elements, before performing a narrowing-and-rounding add operation on the two's complement and the other W-bit data element in exactly the same way as would be the case for the narrowing-and-rounding add instruction. The two's complement may be formed by inverting all the bits of the W-bit data element and adding 1. However, if the two's complement is generated before the first stage additions then this requires an extra addition which would increase the time required to perform the operation. Therefore, a more efficient way of implementing a narrowing-and-rounding subtract instruction may be to control the processing circuitry to perform the N-bit first stage additions with each first stage addition adding one of the N-bit portions to an inverted N-bit portion obtained by inverting the other of the N-bit portions, and then controlling either a first stage addition or a second stage addition to increment its output, which would not occur for a narrowing-and-rounding add instruction. Incrementing the output of one of the first or second stage additions while performing the narrowing-and-rounding arithmetic operation achieves the same effect as if the 1 was added to the inverted N-bit portion prior to performing the narrowing-and-rounding arithmetic operation. Combining this incrementing with one of the first or second stage additions saves one addition cycle. Hence, the narrowing-and-rounding subtract instruction may implemented in almost the same way as the narrowing-and-rounding add instruction, except that one of the input values is inverted and an extra increment is added at one of the N-bit additions.

The narrowing-and-rounding arithmetic operation may be applied to two operands each having only one W-bit data element. However, the narrowing-and-rounding arithmetic operation may also be used in systems supporting single instruction multiple data (SIMD) operations which are applied to operands having multiple data elements. For example, a 64-bit operand may support four 16-bit data elements, two 32-bit data elements or one 64-bit data element, with parallel lanes of processing applied to each data element. Therefore, if the narrowing-and-rounding arithmetic instruction identifies that the two operands each have multiple W-bit data elements then the control circuitry may control the processing circuitry to generate in parallel multiple X-bit result data elements of the result value. For each lane of processing, the plurality of N-bit first stage additions and at least one N-bit second stage addition may be performed to produce a corresponding X-bit result data element. The processing circuitry may then form the result value from the X-bit result data elements generated by the additions in each lane of processing.

The control circuitry may select the number of data elements and the data element size W of the data elements in dependence on a variable parameter of the narrowing-and-rounding arithmetic instruction. For example, the instruction may include a field identifying the data element size W, and the number of data elements may be deduced from this, or vice versa.

The processing circuitry may comprise a plurality of N-bit first adding units and a plurality of N-bit second adding units. The control circuitry may control which first adding units and which second adding units are used to generate each X-bit result data element in dependence on a variable parameter of the narrowing-and-rounding arithmetic instruction, such as the one controlling the data element size or number of data elements. For example, for each respective data element size, there may be a corresponding configuration of the N-bit adding units to provide one or more processing lanes for processing the respective data elements of the two input operands.

For each X-bit result data element, the processing circuitry may perform W/N first stage additions and X/N second stage additions corresponding to X/N of the first stage additions. Typically the X/N second stage additions will correspond to the first stage additions adding the X/N most significant portions of the original W-bit data elements. The X-bit result data element can then be formed from the N-bit result portions generated by the X/N second stage additions. Each first or second stage addition may be performed by respective N-bit adding units. As the circuitry may support different data element sizes, not all the adding units may be required for a particular narrowing-and-rounding arithmetic operation. In particular, there may be some second adding units which do not contribute to the X-bit result. Such second adding units may be made inactive to save energy. Alternatively, it may be simpler from a control point of view for each second adding unit to perform an addition anyway even if its output will not be used to form the X-bit result data element.

Each W-bit data element may comprise W-bits [W−1:0] and each X-bit result data element may comprise X-bits [X−1:0]. The notation [R:S] represents a group of bits extending from a most significant bit at bit position R to a least significant bit at bit position S. The W/N first stage additions and X/N second stage additions for a given processing lane may be performed such that:

the $i^{th}$ first stage addition of said W/N first stage additions adds bits [a+N−1:a] of said corresponding W-bit data elements to generate an $i^{th}$ N-bit intermediate value, where 0≤i≤ (W/N−1) and a=i*N; and the $j^{th}$ second stage addition of said X/N second stage additions adds the $j^{th}$ N-bit intermediate value to the rounding value and the carry value representing the carry output of the $(j-1)^{th}$ first stage addition to generate the N-bit result portion comprising bits [c+N−1:c] of the X-bit result data element, where (W−X)/N≤j≤W/N−1 and c=j*N.

Here, the count values i and j count through the additions performed for a single lane of processing applied to corresponding W-bit data elements of the two operands to generate a corresponding result N-bit data element of the result value. If the two operands have more than one data element each, then these additions will be repeated for each pair of W-bit data elements. Hence, for each lane of processing, i and j will count up to W/N−1 and then start again at 0 for the next lane.

As discussed above, the first stage addition is split into N-bit chunks and carries are not passed between respective first stage additions and are instead added at the second stage. This allows the N-bit first stage additions to be performed in parallel to speed up the operation. However, it could still take some time to determine the carry value of some of the N-bit first stage additions, as the carries of higher first stage additions are still dependent on the results of lower first stage additions. If the carry is determined by rippling through carries all the way from the least significant end of a value to the most significant end, then this may take a long time, making it difficult to perform the narrowing-and-rounding operation in a single processing cycle.

Therefore, to speed up carry determination, the processing apparatus may have a carry network which is configured to determine the carry value to be added at the second stage addition. For at least one second stage addition, the carry network may have a carry forwarding path for supplying a carry value from a carry output of an earlier first stage addition than the preceding first stage addition (the earlier first stage addition adds less significant portions of the W-bit data elements than the preceding first stage addition). The carry forwarding path allows carry values to bypass the preceding first stage addition so that it is not necessary for the carry to be rippled all the way through the preceding first stage addition. This reduces carry propagation delays. Hence, while the carry value added at the second stage addition represents the carry output of the preceding first stage addition, it need not be the actual carry output of the preceding first stage addition since the carry value may instead be predicted using the carry network.

The carry network may have selection circuitry which selects, for the at least one second stage addition, whether to supply as a carry input value the carry output of the preceding first stage addition or the carry output of the earlier first stage addition which is being forwarded on the carry forwarding path. The carry network may make a prediction of whether the carry output of the preceding first stage addition is expected to be dependent on, and have the same value as, the carry output of the first stage addition. If so, then the carry output of the earlier first stage addition can be forwarded to the second stage addition, while otherwise the carry output of the preceding first stage addition may be selected. For example, the carry output of the preceding first stage addition will be dependent on, and have the same value as, a carry output of the earlier first stage addition if the sum of the values added by the preceding first stage addition has all bit values equal to one (which can be determined by performing an exclusive OR of the values being added). If all sum bit values are one, then any carry input to the preceding first stage addition will cause a carry output of the same bit value, and so time can be saved by forwarding the carry output of the earlier first stage addition directly to the second stage addition without rippling the carry all the way through the preceding first stage addition.

By performing similar carry predictions for each successive first stage addition within the same W-bit processing lane, the carry output of the first stage additions can be predicted based on a number of N-bit additions performed in parallel with one another without requiring a carry output from one first stage addition to be input to another first stage addition. Carry values can be forwarded such that they bypass several adding units. This means that the critical path through the processing circuitry can be reduced to one N-bit first stage addition and one N-bit second stage addition, with multiple first or second stage additions being performed in parallel with one another if necessary. Therefore, the carry network enables the operation to be accelerated and reduces the time required for performing the narrowing-and-rounding arithmetic operation.

The rounding value may be generated in various ways. In general, the rounding value may be generated such that it has a value which causes the X-bit result data element to be equivalent to the nearest X-bit value to a W-bit value corresponding to the sum or difference of the corresponding W-bit data elements (this W-bit value is not actually calculated by the processing circuitry). If the sum or difference lies halfway between two X-bit data values then various rounding schemes may be used to determine whether to round up or down. For example, ties can always be rounded up, or could be rounded away from zero, or could be rounded to the nearest odd or even value as desired.

For rounding to the nearest X-bit value, with ties rounded up, a simple way of implementing this is to add a rounding value having the same bit value as the most significant bit of the W-bit value sum or difference that does not have a bit of corresponding significance in the nearest X-bit value (referred to as the "most significant excluded bit"). If adding or subtracting the two W-bit data elements would produce a W-bit sum or difference value [W−1:0], the most significant excluded bit would be bit [W−X−1]. While the W-bit sum or difference value is not actually generated because the W-bit addition is actually split into several N-bit first stage additions, the processing circuitry can determine what the value of the most significant excluded bit would be if an W-bit addition was actually performed, and set the rounding bit accordingly.

For each processing lane, the rounding bit for the least significant second stage addition in that lane may be determined based on result of the preceding first stage additions. It would be possible for an extra second stage addition to be performed for adding the N-bit intermediate values and carry output of these first stage additions so that the value of the most significant excluded bit of the sum or difference can be determined. However, this may increase the processing time because it may require carries to be rippled through several second stage adders to determine whether the most significant excluded bit would be 1 or 0. Therefore, to speed things up the rounding value may be determined directly from the intermediate values and carry outputs of the first stage additions which add less significant N-bit portions than the first stage addition corresponding to the least significant second stage addition. This avoids any need for a carry-out to carry-in paths along the second stage additions, allowing the operation to be performed more quickly.

If X is greater than N then multiple second stage additions may be required within the same processing lane. For a more significant second stage addition for generating an N-bit portion of the X-bit result data element that is more significant than the least significant end bit portion, one may think that it is not necessary to add a rounding value (normally, a rounding value would be added only at the least significant end of the result value and then carries may ripple through to the more significant end of the result value). However, in this case the second stage addition would effectively be adding values having more than N bits, and the carries would cause the processing time to increase. To improve performance, the second stage addition is separated into N-bit portions. The rounding value for a more significant second stage addition is generated with a value representing whether the rounding value added at the least significant second stage addition would cause a carry to propagate through to the more significant second stage addition which would not have occurred if the rounding value was not added by the least significant second stage addition. Hence, the processing circuitry may determine whether such a carry would occur and if so may set rounding values for the more significant N-bit chunks of the second stage additions accordingly. The rounding value for the more significant second stage addition may be determined directly based on the intermediate value and carry output of at least one first stage addition without actually propagating the carry from the least significant second stage addition to the more significant second stage addition. Eliminating these carry-out to carry-in paths along the second stage additions enables performance to be improved.

Viewed from another aspect, the present invention provides a data processing apparatus comprising:

processing means for processing data; and control means for controlling said processing means to perform a narrowing-and-rounding arithmetic operation in response to a narrowing-and-rounding arithmetic instruction identifying two operands each comprising at least one W-bit data element, said narrowing-and-rounding arithmetic operation generating a result value comprising at least one X-bit result data element, each X-bit result data element representing a sum or difference of corresponding W-bit data elements of said two operands rounded to an X-bit value, where W and X are integers and W>X;

wherein said control means is configured to control said processing means to generate each X-bit result data element of said result value by:
(a) performing a plurality of N-bit first stage additions to generate respective N-bit intermediate values by adding or subtracting N-bit portions of said corresponding W-bit data elements, where W=J*N and J>1 and N and J are integers;
(b) performing one or more N-bit second stage additions, each second stage addition for converting the N-bit intermediate value generated by a corresponding first stage addition into an N-bit rounded result portion of said X-bit result data element by adding a rounding value and a carry value representing a carry output of a preceding first stage addition for adding less significant N-bit portions of said corresponding W-bit data elements than said corresponding first stage addition; and
(c) forming said X-bit result data element from the N-bit result portion generated by at least one of said one or more N-bit second stage additions.

Viewed form a further aspect, the present invention provides a data processing method for a data processing apparatus, comprising:

in response to a narrowing-and-rounding arithmetic instruction identifying two operands each comprising at least one W-bit data element, performing a narrowing-and-rounding operation to generate a result value comprising at least one X-bit result data element, each X-bit result data element representing a sum or difference of corresponding W-bit data elements of said two operands rounded to an X-bit value, where W and X are integers and W>X;

wherein each X-bit result data element is generated by:
(a) performing a plurality of N-bit first stage additions to generate respective N-bit intermediate values by adding or subtracting N-bit portions of said corresponding W-bit data elements, where W=J*N and J>1 and N and J are integers;
(b) performing one or more N-bit second stage additions, each second stage addition for converting the N-bit intermediate value generated by a corresponding first stage addition into an N-bit rounded result portion of said X-bit result data element by adding a rounding value and a carry value representing a carry output of a preceding first stage addition for adding less significant N-bit portions of said corresponding W-bit data elements than said corresponding first stage addition; and
(c) forming said X-bit result data element from the N-bit result portion generated by at least one of said one or more N-bit second stage additions.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
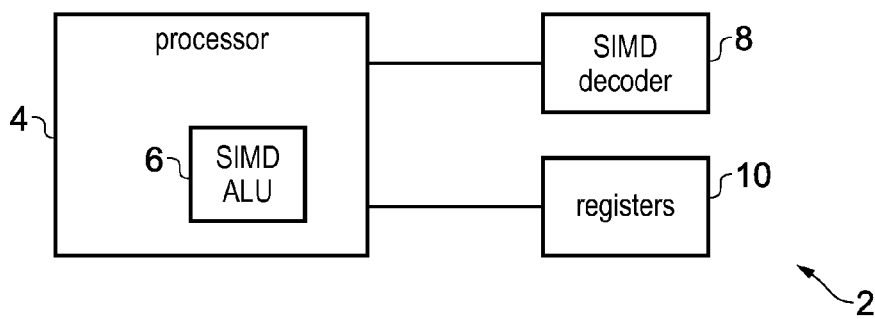
FIG. 1 schematically illustrates a portion of a data processing apparatus.

FIG. 1 schematically illustrates a portion of a data processing apparatus 2 for processing data. The apparatus 2 has a processor 4 which includes a single instruction multiple data (SIMD) processing unit 6 for performing SIMD processing operations on operands comprising one or more data elements. SIMD instruction decoder 8 is provided for decoding SIMD instructions and controlling the SIMD processing unit 6 to perform SIMD operations in response to the instructions. In one example, the SIMD decoder 8 may be a combined decoder which also decodes non-SIMD instructions for performing non-SIMD operations. Alternatively, a separate non-SIMD decoder could be provided. The apparatus 2 also has registers 10 for storing data values. In response to instructions, the processing circuitry 4 may read operands to be processed from the registers 10 and may store result values to the registers 10. It will be appreciated that the apparatus 2 may also comprise many other components which are not illustrated in FIG. 1 for conciseness.

Figure 2:
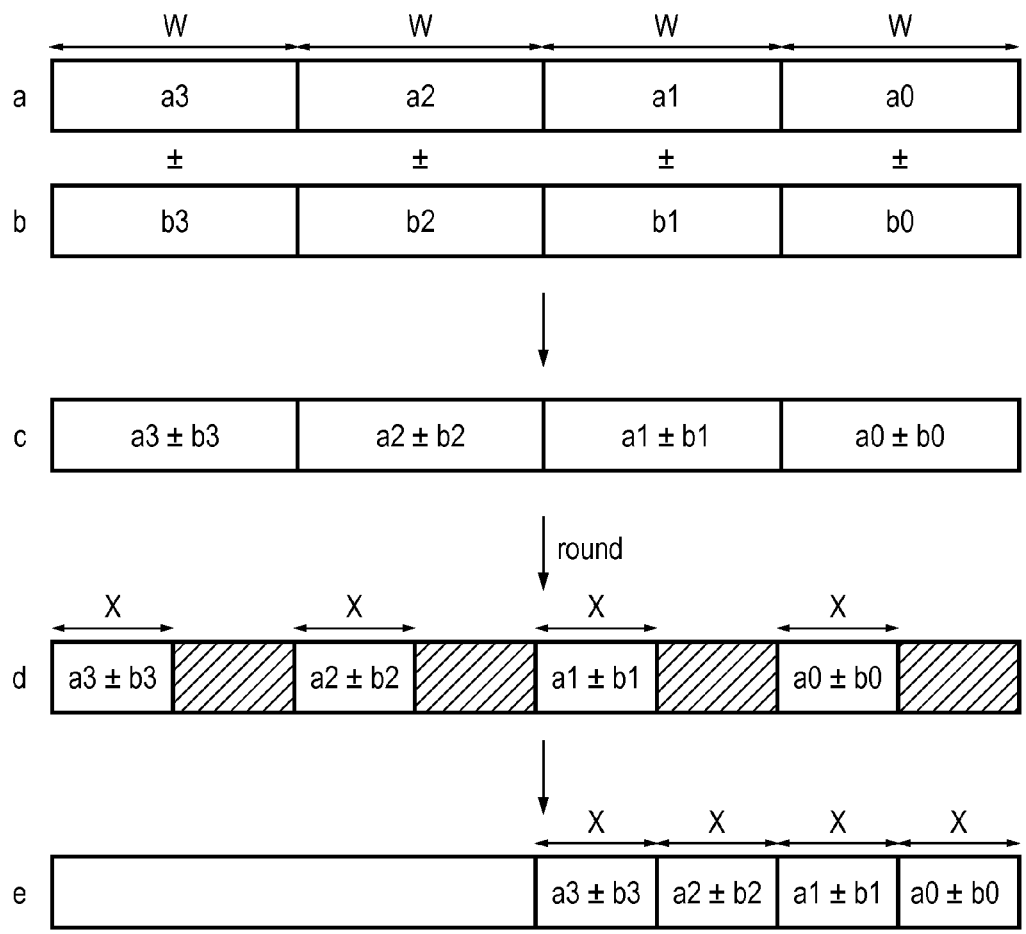
FIG. 2 schematically illustrates a narrowing-and-rounding arithmetic operation.

FIG. 2 schematically illustrates a narrowing-and-rounding arithmetic operation performed on two operands a, b each comprising four data elements a0-a3, b0-b3. Each data element has W bits. In the narrowing-and-rounding arithmetic operation, corresponding data elements of the operands a, b are added or subtracted to produce sum or difference values a±b in each data element of an intermediate data value c. Each data element of the intermediate value c is then rounded to an X-bit value in a result value d. Finally, the X-bit portions within each data element of value d are gathered together and placed in adjacent portions of a second result value e. The gathering step from d to e in FIG. 2 is optional, and in other examples the result of the narrowing-and-rounding arithmetic operation may be the result value d.

Figure 3:
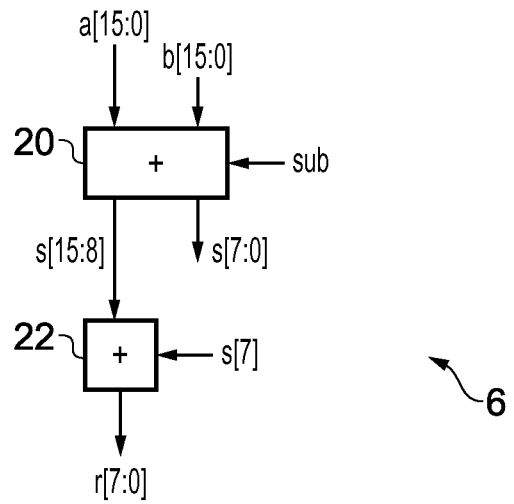
FIG. 3 illustrates a potential implementation of the narrowing-and-rounding arithmetic operation.

FIG. 2 shows the mathematical operations for the narrowing-and-rounding arithmetic operation. In practice, the processing circuitry 4 may not actually perform these exact mathematical operations, and it may be more efficient to generate the same result value d or e in other ways. FIG. 3 shows an example of circuitry for performing the narrowing-and-rounding arithmetic operation on a single pair of 16-bit elements. The circuitry of FIG. 3 may correspond to the processing in one of the processing lanes shown in FIG. 2. As shown in FIG. 3, a 16-bit adder 20 may add or subtract two 16-bit data elements a[15:0] and b[15:0]. If a narrowing-and-rounding subtraction is to be performed then the b input is inverted and a value sub, which is connected to the carry input of the 16-bit adder 20, is set to 1 so as to effectively form the two's complement of the operand b. For an addition, sub is set to 0. Regardless of whether a and b are to be added or subtracted, the adder 20 outputs a 16-bit value s[15:0]. A second 8-bit adder 22 then takes the upper 8 bits s[15:8] of the first sum and adds a rounding value s[7] corresponding to the most significant bit of the excluded portion of the output of the first adder 20. The sum of the rounding value and the non-excluded portion s[15:8] of the 16-bit sum is then output as an 8-bit rounded result value r[7:0].

Hence, in FIG. 3 the narrowing-and-rounding operation is performed using the same mathematical operations as shown in FIG. 2. However, performing a 16-bit addition using the adder 20 is slow because each successive bit of the addition must wait for the result of the preceding bit to be available before being added, in case a carry needs to be propagated from the preceding bit. Hence, the circuit shown in FIG. 3 has an effective critical path of 24 bits, because the 16-bit addition must be performed first by adder 20 and then another 8-bit addition needs to be performed by adder 22 once the 16-bit addition is complete.

Figure 4:
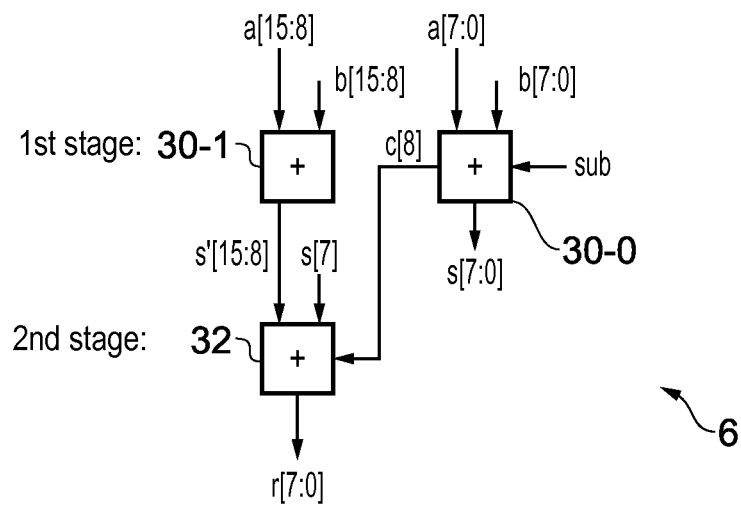
FIG. 4 illustrates an implementation of a narrowing-and-rounding arithmetic operation in which a carry value from a first stage addition is input at a second stage addition for rounding.

The circuit shown in FIG. 3 can be accelerated by observing that the initial 16-bit adder 20 can be split into two 8-bit first stage adders 30-0, 30-1 as shown in FIG. 4. This means that the upper 8 bits of the initial sum, denoted s'[15:8], are available at the same time as the lower 8 bits s[7:0]. However, the carry out bit c[8] of the lower adder 30-0 has not yet been added into the upper 8 bits s'[15:8] and so the intermediate value s'[15:8] is not representative of the upper 8 bits of the true sum of a[15:0] and b[15:0]. However, this is not a problem, because a rounding addition still needs to be performed by 8-bit adder 32, and the carry bit c[8] can be added at the same time as the rounding value s[7] using adder 32. Hence, the second stage adder 32 adds the intermediate value s'[15:8], the rounding value s[7] and the carry value c[8] to form the final rounded result r[7:0]. Hence, the critical path is reduced from 24 bits to 16 bits because the first stage addition has been split into two 8-bit chunks 30-0, 30-1 which are performed in parallel with each other and so the critical path is one 8-bit first stage addition and one 8-bit second stage addition. By adding the carry bits at the second stage rather than the first stage, the overall processing time can be reduced.

Figure 5:
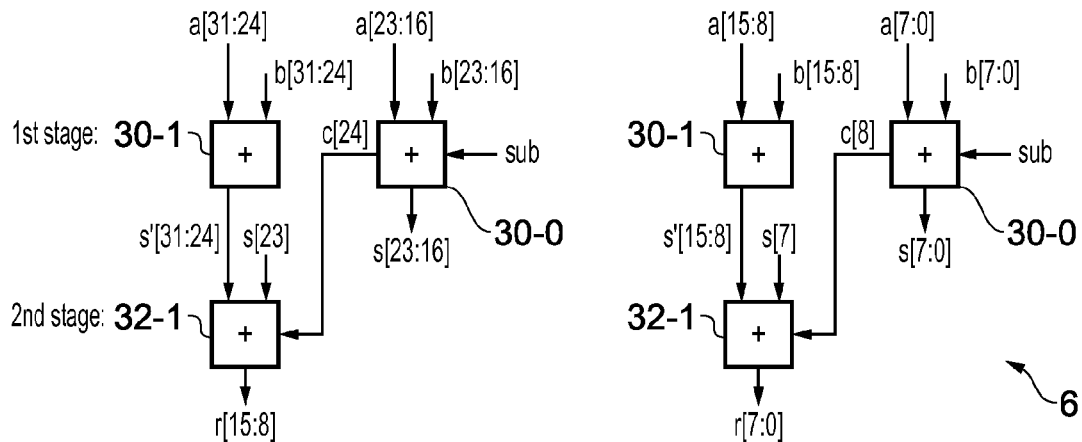
FIG. 5 illustrates circuitry for performing concurrent narrowing-and-rounding arithmetic operations on two pairs of 16-bit data elements.

As shown in FIG. 5, the circuitry shown in FIG. 4 can be duplicated so that the narrowing-and-rounding arithmetic can be performed in parallel on two pairs of 16-bit data elements to generate a result value having two 8-bit data elements. Within each lane of processing, the operation is the same as shown in FIG. 4.

Figure 6:
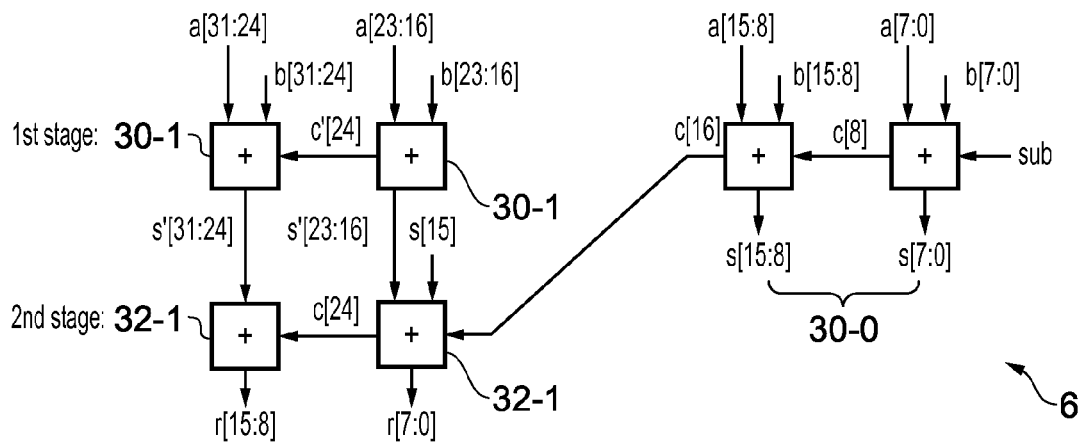
FIG. 6 illustrates a potential implementation of a narrowing-and-rounding arithmetic operation performed on a pair of 32-bit data elements.

As shown in FIG. 6, the narrowing-and-rounding arithmetic operation may be performed on a pair of 32-bit data elements to generate a 16-bit result data element. FIG. 6 is similar to FIG. 4 except that each 8-bit adder has been replaced with a 16-bit adder (with each 16-bit adder formed of two 8-bit adders with the carry output of one 8-bit adder connected to the carry input of the other 8-bit adder). However, this means that the critical path transverses two 16-bit adders (or four 8-bit adders) which is lengthy and may mean that the operation cannot be performed in a single processing cycle.

Figure 7:
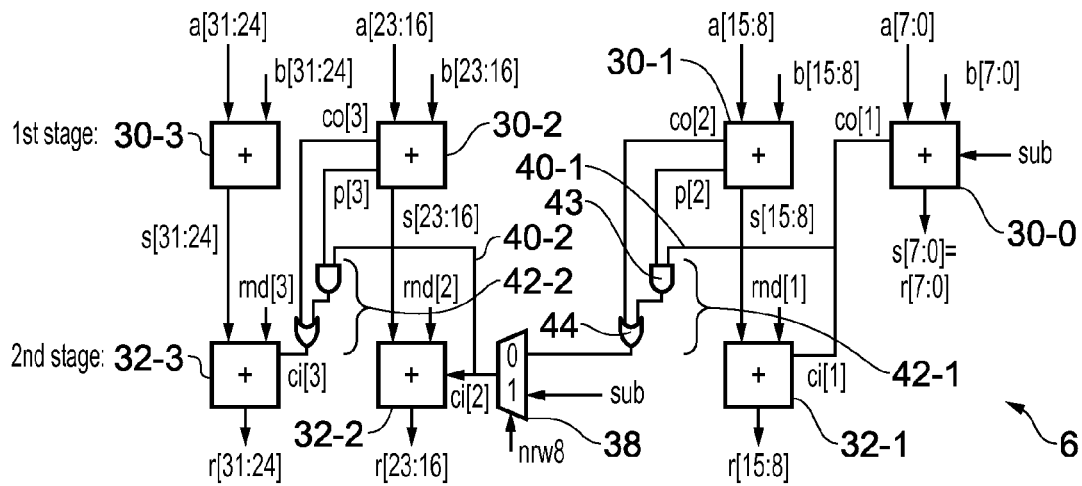
FIG. 7 illustrates a portion of processing circuitry for performing a narrowing-and-rounding arithmetic operation on two pairs of 16-bit data elements or one pair of 32-bit data elements.

Therefore, the 32-bit narrowing-and-rounding operation can be accelerated by providing circuitry as shown in FIG. 7. The portion of the SIMD processing unit 6 shown in FIG. 7 can be used to perform a rounding-and-narrowing arithmetic operation on two pairs of 16-bit data elements a[31:16], b[31:16] and a[15:0], b[15:0] or one pair of 32-bit data elements a[31:0], b[31:0]. A control signal nrw8 controls the data element size and is set based on a parameter of the narrowing-and-rounding arithmetic instruction which identifies the data element size. When the data element size W=16 (i.e. 16- to 8-bit narrowing), then the control signal nrw8 is set to 1, and when W=32 (i.e. 32- to 16-bit narrowing), then the control signal nrw8 is set to 0.

As shown in FIG. 7, the SIMD processing unit 6 has four first stage adding units 30-0 to 30-3 which each add corresponding 8-bit portions of the input operands a, b to produce respective 8-bit intermediate values s[31:24], s[23:14], s[15:8], s[7:0]. Several 8-bit second stage adders 32-1 to 32-3 are provided. Each second stage adder 32-$j$ adds the intermediate value s generated by the corresponding first stage adder 30-$j$, a rounding value rnd[j] and a carry value ci[j] representing the carry output co[j] of the preceding adding unit 30-($j$−1), to generate an N-bit result portion r, where j=1, 2 or 3. When nrw8 is 1 (16-bit to 8-bit narrowing) then the result value is formed from the 8-bit result portions r[31:24], r[15:8] output by second stage adding units 32-3, 32-1. When nrw8 is 0 (32-bit to 16-bit narrowing), then the result value is formed from the result portions r[31:24], r[23:16] output by second adding units 32-3, 32-2.

A multiplexer 38 controls whether 16- or 32-bit narrowing is performed based on the control signal nrw8. If nrw8 equals 1 (16-bit to 8-bit narrowing), then the sub value is input at the carry input of the second stage adder 32-2, so that if a subtraction is performed (sub=1) then the result will be incremented to reflect the two's complement of one of the operands, as discussed above for FIG. 3. The sub input for the other processing lane is added at the first stage adder 30-0. Hence, the value sub can be added at either the first stage or the second stage. On the other hand when control signal nrw8 is 0 (32-bit to 16-bit narrowing), then a carry value can be input at the carry input ci[2] of the second stage adder 32-2. Hence, the multiplexer 38 controls whether the SIMD processing circuitry 6 functions as one 32-bit processing lane or two independent 16-bit processing lanes.

The SIMD processing circuitry 6 shown in FIG. 7 has a carry network comprising carry forwarding paths 40-1, 40-2 and selection circuitry 42-1, 42-2. The carry network is for accelerating processing by predicting values of the carry outputs co[2], co[3] of the first stage adders 30-1, 30-2, without requiring carries to actually be rippled through from lower first stage adders. The carry output co[1] of the least significant first stage adding unit 30-0 is input directly as a carry input ci[1] to the lowest second stage adding unit 32-1. The carry output co[1] of adding unit 30-0 is also forwarded via a forwarding path 40-1 to the next highest second stage adding unit 32-2. The selection circuitry 42-1 selects whether a carry input ci[2] to the next highest second stage adder 32-2 should be equal to the carry output co[1] of the first stage adder 30-0 received on the forwarding path 40-1, or the carry output co[2] of the next first stage adding unit 30-1. The selection circuitry 42-1 receives a propagation signal p[2] from the first adding unit 30-1 indicating whether all 8 output sum bits s[15:8] produced by adder 30-1 will be high. The propagation signal p[2] can be generated before the sum value s[15:8] itself is actually available. For example, an exclusive OR (XOR) operation can be performed on a[15:8] and b[15:8] using XOR circuitry associated with the adder 30-1, and p[2] may equal 1 if the result of the XOR operation has all its bits equal to 1, and otherwise p[2] may equal 0. If p[2] equals 1, then this means that if a carry was input to the first adding unit 30-1 then its carry output co[2] would have the same value as the carry input. Therefore, the value of co[2] could be predicted from the carry output co[1] of the preceding first stage adding unit 30-0. Hence, when p[2] equals 1, then the preceding carry output co[1] is forwarded to the second stage adding unit 32-2 and it is not necessary to wait for the carry output co[2] of the next first stage adding unit 30-1 to be generated. The selection circuitry 42-1 comprises an AND gate 43 and an OR gate 44. The AND gate 43 forwards the carry output co[1] only if the value of the propagation bit p[2] is 1. The OR gate 44 passes either the carry output co[2] of the adder 30-1 or the output of the AND gate 43. Hence, the carry network allows the carry input ci[2] to the second stage adder 32-2 to be determined based on the results of 8-bit additions performed by first stage adders 30-0, 30-1, without needing to pass a carry between these adders. Similarly, the first stage adder 30-2 generates a propagation bit p[3] in the same way as adder 30-1, and selection circuitry 42-2 determines based on p[3] whether the carry input ci[3] of second stage adder 32-3 should be the carry output co[3] of first stage adder 30-2, or an earlier carry co[1] or co[2] forwarded via forwarding path 40-2.

The carry network therefore generates the carry values ci[1] to ci[3] as follows:

ci[1]=co[1]

ci[2]=nrw8 & sub|!nrw8 & co[2]|!nrw8 & p[2] & co[1]

ci[3]=co[3]|p[3] & ci[2].

(where & means logical AND, | means logical OR, and !nrw8 means the inverse of nrw8—i.e. if nrw8=0 then !nrw8=1 and if nrw8=1 then !nrw8=0).

The rounding values rnd[n] for the second stage adders 32-1 to 32-3 are determined as follows:

rnd[1]=nrw8 & r[7]

rnd[2]=!nrw8 & r[15]

rnd[3]=nrw8 & r[23]|!nrw8 & r[15] &((s[23:17] ==7'h7f)&(ci[2] XOR s[16])

For rnd[3], the expression above can be understood as follows:

"if narrowing s[31:16]+ci[2] to r[31:24], set rnd[3] high if r[23] is high;

else, if narrowing s[31:0] to r[31:16], set rnd[3] high only if rnd[2] causes a carry-out into bit position r[24], taking into account that the case when s[23:16]+ci[2] causes a carry is already covered by the carry acceleration network".

Effectively, for either 16- or 32-bit narrowing, the least significant second stage adder within each processing lane has a rounding bit corresponding to the value of the most significant excluded bit (r[7] for 16-bit to 8-bit narrowing, and r[15] for 32-bit to 16-bit narrowing). In the case of 32-bit narrowing, there is a more significant second stage addition 32-3 which receives a rounding value which represents whether the rounding value rnd[2] input at the least significant second stage addition 32-2 would cause a carry to ripple along to the more significant second stage adder 32-3, which would not have occurred if that rounding value had not been input. This is represented by rnd[3] above.

As shown above, the rounding values rnd[1] to rnd[3] are dependent on the values of bits r[15], r[23] which are generated by second stage adders 32-1, 32-2. Waiting for these bits to become available before performing subsequent additions with second stage adders 32-2, 32-3 would delay processing, which is undesirable. Therefore, the processing can be accelerated further by predicting the values of r[15] and r[23] based on the intermediate values s and carry outputs co generated by the first stage adders 30 according to the following expressions:

r[15]=s[15] XOR((s[14:8]==7'h7f)&co[1])

r[23]=s[23] XOR((s[22:16]==7'h7f)&ci[2]), where (s[14:8]==7'h7f) and (s[22:16]==7'h7f) are equal to 1 if all the bits of s[14:8] or s[22:16] are 1.

This allows all the rounding values rnd to be determined based on the results of the first stage additions, without requiring any carry-out to carry-in path between 8-bit adders at either the first stage or the second stage. This allows a synthesis engine to optimise the processing logic to achieve highest performance. Hence, the critical timing path through the circuitry shown in FIG. 7, for both 32-bit to 16-bit rounding and 16-bit to 8-bit rounding, corresponds to a path through two 8-bit adders and a little additional carry forwarding circuitry, which is much less than in FIG. 6.

Figure 8:
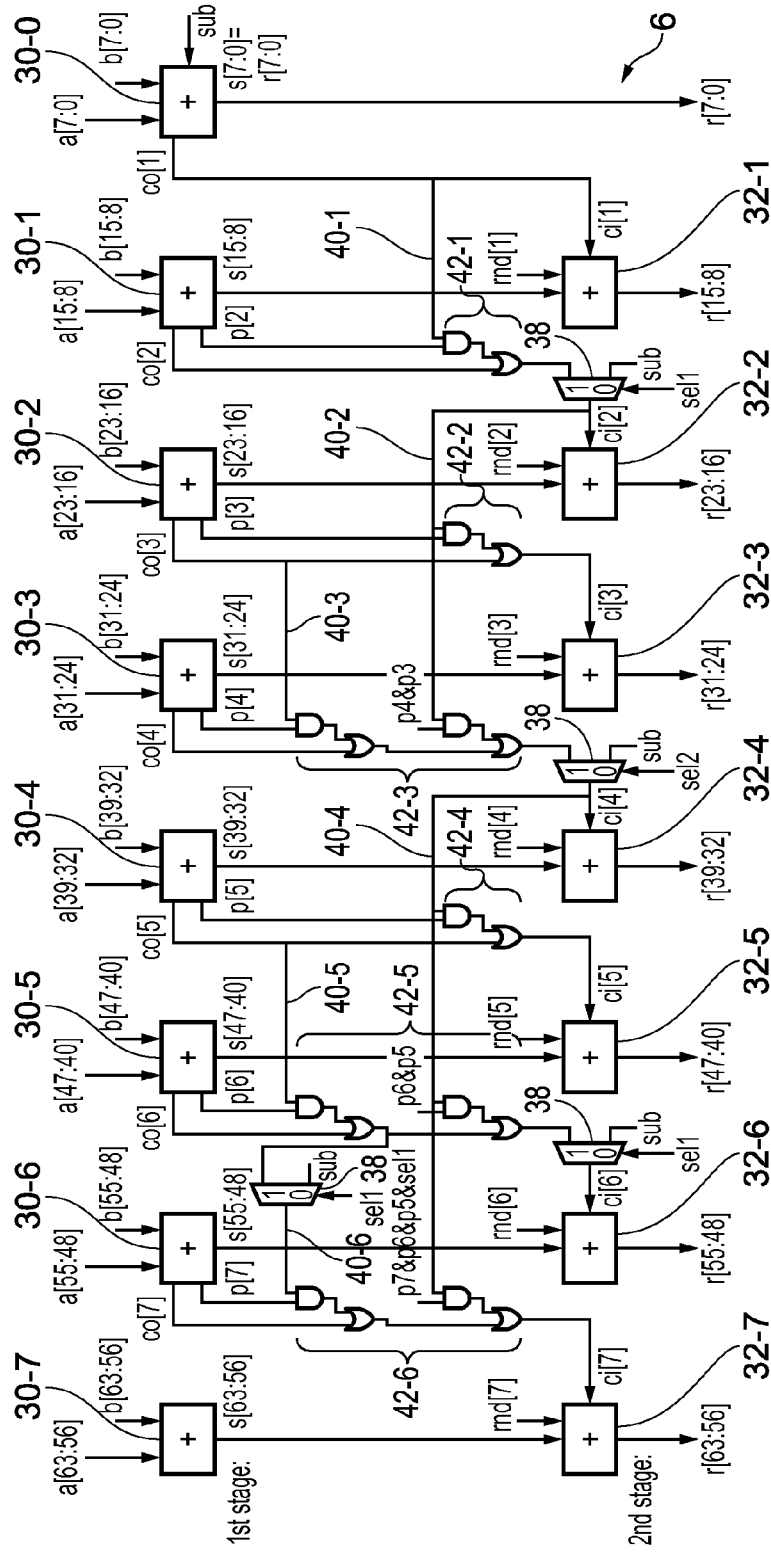
FIG. 8 illustrates circuitry for performing a narrowing-and-rounding operation on four pairs of 16-bit data elements, two pairs of 32-bit data elements or one pair of 64-bit data elements.

FIG. 8 shows another embodiment in which a 64-bit to 32-bit narrowing-and-rounding arithmetic operation is supported. The SIMD processing circuitry 6 receives two 64-bit operands a[63:0], b[63:0] which may each include four 16-bit data elements, two 32-bit data elements or one 64-bit data element. Two control signals sel1, sel2 are used to select the respective types of narrowing. The table at the bottom of FIG. 8 shows the values of the control signals sel1, sel2 for each type of narrowing, and how the final result value n[31:0] is formed from the outputs of the second stage adders 32. Hence, there are several different data element configurations supported by the SIMD processing unit 6. Several multiplexers 38 are provided for controlling whether adding units 30, 32 process different portions within the same processing lane or operate on different data elements in different processing lanes. The sub value is input at the lower end of each processing lane using one or more of adders 30-0, 32-2, 32-4, 32-6 (depending on data element size).

Again, the processing unit has a carry network comprising forwarding paths 40-1 to 40-6 and selection circuitry 42-1 to 42-6 for accelerating the determination of the carry values ci[2] to ci[7] to be input to the second stage adders 32-2 to 32-7. In FIG. 8, some of the selection circuitry 42-3, 42-5, 42-6 is more complicated than in FIG. 7 because some of the forwarding paths allow carry values to skip several adding units, and so determining whether this is possible requires each of the intervening propagation bits p[n] to be equal to 1. The selection circuitry 42 and multiplexers 38 together provide circuitry for determining the carry inputs for each second stage adding units 32 according to the following logical expressions:

ci[1]=co[1]

ci[2]=!sel1 & sub|sel1 &(co[2]|p[2] & co[1]).

ci[3]=co[3]|p[3] & ci[2].

ci[4]=!sel2 & sub|sel1 &(co[4]|p[4] & co[3]|p[4] & p[3] & ci[2])

ci[5]=co[5]|p[5] & ci[4]

ci[6]=!sel1 & sub|sel1 &(co[6]|p[6] & co[5]|p[6] & p[5] & ci[4])

ci[7]=co[7]|sel1 & p[7] &(co[6]|p[6] & co[5])|!sel1 & p[7] & sub|sel1 & p[7]&p[6]&p[5] & ci[4].

The rounding values rnd[1] to rnd[7], which are set high if the initial narrowed result is to be incremented, are determined according to the following expressions:

rnd[1]=nrw8 & r[7]

rnd[2]=nrw16 & r[15]

rnd[3]=nrw8 & r[23]|nrw16 & r[15] &((s[23:17]
    ==7'h7f)&(ci[2] XOR s[16]))

rnd[4]=nrw32 & r[31]

rnd[5]=nrw8 & r[39]|nrw32 & r[31] &((s[39:33]
    ==7'h7f)&(ci[4] XOR s[32]))

rnd[6]=nrw16 & r[47]|nrw32 & r[31] &((s[39:33]
    ==7'h7f)&(ci[4] XOR s[32]))&((s[47:41]
    ==7'h7f)&(ci[5] XOR s[40]))

rnd[7]=nrw8 & r[55]|nrw16 & r[47] &((s[55:49]
    ==7'h7f)&(ci[6] XOR s[48]))|nrw32 & r[31]
    &((s[39:33]==7'h7f)&(ci[4] XOR s[32]))&((s
    [47:41]==7'h7f)&(ci[5] XOR s[40]))&((s[55:49]
    ==7'h7f)&(ci[6] XOR s[48])), where nrw8=!sel2 & !sel1, nrw16=!sel2 & sel1, and nrw32=sel2 & sel1, representing the different combinations of the control signals sel1, sel2 for "narrow to 8 bits" (nrw8), "narrow to 16 bits" (nrw16) and "narrow to 32 bits" (nrw32) respectively,
and r[n], for n={15, 23, 31, 39, 47, 55, 63}, can be replaced advantageously as follows:

r[15]=s[15] XOR(s[14:8]==7'h7f)&ci[1]

r[23]=s[23] XOR(s[22:16]==7'h7f)&ci[2]

r[31]=s[31] XOR(s[30:24]==7'h7f)&ci[3]

r[39]=s[39] XOR(s[38:32]==7'h7f)&ci[4]

r[47]=s[47] XOR(s[46:40]==7'h7f)& ci[5]

r[55]=s[55] XOR(s[54:48]==7'h7f)& ci[6]

r[63]=s[63] XOR(s[62:55]==7'h7f)& ci[7].

By determining the carry values ci[n] and rounding values rnd[n] for the second stage additions 32 in this way, this scheme allows narrowing-and-rounding additions and subtractions to be completed quickly, with a critical path traversing only 2 of the 8-bit adders plus some overlaid carry logic, i.e. 16 bits of addition, even when the data element size is as large as 64 bits. In contrast, if a full 64-bit addition was performed at the first stage addition followed by a 32-bit addition to add the rounding value (as would be the case if the technique of FIG. 3 was scaled up to 64 bits), then the critical path would be 96 bits of addition, which would be much slower. By splitting the operation into 8-bit chunks which can be performed in parallel with each other, the narrowing-and-rounding addition or subtracting operation can be performed fast enough to fit within a single processing cycle.

It is not essential for 8-bit additions to be performed at the first stage and at the second stage. For example, a 64-bit to 32-bit narrowing could be performed using 16-bit additions, which some processors may still be able to perform in one cycle. However, in general the performance improvement will be greatest if smaller adders are used. Most generally, the narrowing-and-rounding operation may be performed on one or more W-bit data elements using N-bit adders, where N<W.

Similarly, it is not essential for the rounded result to have half the number of bits as the original W-bit data elements. An arbitrary result data element size X may be used, were X<W. It may be most convenient if X is a multiple of N so that the result is formed from the full outputs of a certain number of second stage adders. For example, a 64- to 16-bit narrowing could be performed where the outputs r[63:48] of adders 32-7, 32-6 of FIG. 8 are used to generate a 16-bit data element in the final result value n[16:0].

Figure 9:
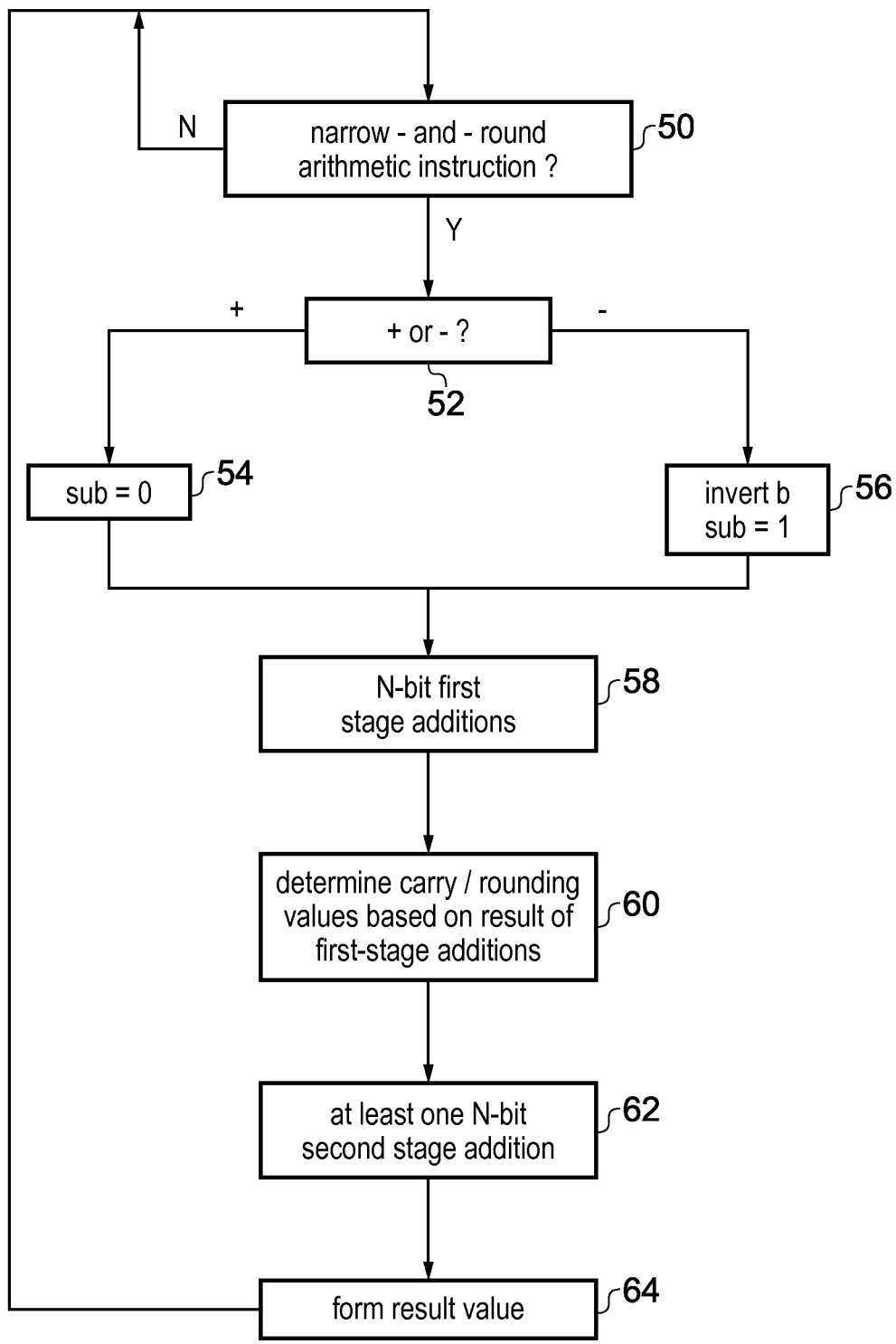
FIG. 9 shows a method of performing a narrowing-and-rounding arithmetic operation.

FIG. 9 shows a method for performing a narrowing-and-rounding arithmetic operation. At step 50, it is determined whether the next instruction to be executed is a narrowing-and-rounding arithmetic instruction. If not, then the instruction is another type of instruction and is processed accordingly. When a narrowing-and-rounding instruction is encountered at step 50, then the method proceeds to step 52 where it is determined whether the instruction is an narrowing-and-rounding add instruction or a narrowing-and-rounding subtract instruction. If the instruction is a narrowing-and-rounding adding instruction then at step 54 the sub input to the processing circuitry is set to 0, while if the instruction is a narrowing-and-rounding subtract instruction then at step 56 the second operand b is inverted and the sub input is set to 1.

At step 58, the processing circuitry 6 performs the N-bit first stage additions using the N-bit first stage adding units 30. Depending on the number of data elements in the input operands a, b, one or more lanes of processing are performed. Each data element has W bits [W−1:0] and so W/N first stage additions are performed in each processing lane. The $i^{th}$ first stage addition of each processing lane adds bits [a+N−1:a] of the corresponding W-bit data elements to generate an $i^{th}$ N-bit intermediate value, where 0≤i≤(W/N−1) and a=i*N.

At step 60 the carry values and rounding values for the second stage additions 32 are determined based on the results of the first stage addition 30 using the relationships shown above for FIG. 7 or 8. At step 62 at least one N-bit second stage addition is performed by the N-bit second stage adding units 32 to generate N-bit result portions r. Within each processing lane, X/N second stage additions are performed, where X is the number of bits to be included in each result data element. The $j^{th}$ second stage addition of each processing lane adds the $j^{th}$ N-bit intermediate value generated by the $j^{th}$ first stage addition to the rounding value and the carry value representing the carry output of the $(j-1)^{th}$ first stage addition, to generate the N-bit result portion comprising bits [c+N−1:c] of the X-bit result data element, where (W−X)/N≤j≤W/N−1 and c=j*N.

At step 64 the result value is formed from the N-bit result portions of the second stage additions. The SIMD processing unit 6 may place the outputs of selected second stage adders in corresponding bit positions of a result value (to generate a result value similar to result value d in FIG. 2). Alternatively, the SIMD processing unit 6 may gather together the outputs of the selected second stage adders 32 so that they are placed in adjacent portions of the result value (similar to result value e in FIG. 2). The table at the bottom of FIG. 8 shows an example of how the outputs of the second stage adders 32 can be mapped to the final result value n.

Hence, the present technique provides an efficient implementation of the narrowing-and-rounding arithmetic operation, allowing processing performance to be improved.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. A data processing apparatus comprising:
   processing circuitry configured to process data; and
   control circuitry configured to control said processing circuitry to perform a narrowing-and-rounding arithmetic operation in response to a narrowing-and-rounding arithmetic instruction identifying two operands each comprising at least one W-bit data element, said narrow- ing-and-rounding arithmetic operation generating a result value comprising at least one X-bit result data element, each X-bit result data element representing a sum or difference of corresponding W-bit data elements of said two operands rounded to an X-bit value, where W and X are integers and W>X;
  wherein said control circuitry is configured to control said processing circuitry to generate each X-bit result data element of said result value by:
  (a) performing a plurality of N-bit first stage additions to generate respective N-bit intermediate values by adding or subtracting N-bit portions of said corresponding W-bit data elements, where W=J*N and J>1 and N and J are integers;
  (b) performing one or more N-bit second stage additions, each second stage addition for converting the N-bit intermediate value generated by a corresponding first stage addition into an N-bit rounded result portion of said X-bit result data element by adding a rounding value and a carry value representing a carry output of a preceding first stage addition for adding less significant N-bit portions of said corresponding W-bit data elements than said corresponding first stage addition; and
  (c) forming said X-bit result data element from the N-bit result portion generated by at least one of said one or more N-bit second stage additions.

2. The data processing apparatus according to claim 1, wherein said control circuitry is configured to control said processing circuitry to perform said narrowing-and-rounding arithmetic operation in a single processing cycle.

3. The data processing apparatus according to claim 1, wherein X=W/2.

4. The data processing apparatus according to claim 1, wherein said narrowing-and-rounding arithmetic instruction comprises a narrowing-and-rounding add instruction and a narrowing-and-rounding subtract instruction;
  in response to said narrowing-and-rounding add instruction, said control circuitry is configured to control said first stage additions to add said N-bit portions of said corresponding W-bit data elements; and
  in response to said narrowing-and-rounding subtract instruction, said control circuitry is configured to control said first stage additions to subtract said N-bit portions of said corresponding W-bit data elements.

5. The data processing apparatus according to claim 4, wherein in response to said narrowing-and-rounding subtract instruction, said control circuitry is configured to:
  (a) control the processing circuitry to perform said plurality of first stage additions with each first stage addition adding one of said N-bit portions to an inverted N-bit portion obtained by inverting the other of said N-bit portions; and
  (b) control the processing circuitry to increment an output of one of said plurality of first stage additions or one of said one or more second stage additions.

6. The data processing apparatus according to claim 1, wherein in response to said narrowing-and-rounding arithmetic instruction identifying said two operands each comprising a plurality of W-bit data elements, said control circuitry is configured to control said processing circuitry to generate in parallel a plurality of X-bit result data elements of said result value.

7. The data processing apparatus according to claim 6, wherein said control circuitry is configured to select the number of data elements and a data element size W of the data elements in dependence on a variable parameter of said narrowing-and-rounding arithmetic instruction.

8. The data processing apparatus according to claim 1, wherein said processing circuitry comprises a plurality of N-bit first adding units for performing said N-bit first stage additions and a plurality of N-bit second adding units for performing said at least one N-bit second stage addition.

9. The data processing apparatus according to claim 8, wherein said control circuitry is configured to control which first adding units and which second adding units are used to generate each X-bit result data element in dependence on a variable parameter of the narrowing-and-rounding arithmetic instruction.

10. The data processing apparatus according to claim 1, wherein said control circuitry is configured to control said processing circuitry to generate each X-bit result data element of said result value by:
  (a) performing W/N first stage additions;
  (b) performing X/N second stage additions corresponding to X/N first stage additions of said W/N first stage additions; and
  (c) forming said X-bit result data element from the N-bit result portion generated by said X/N second stage additions.

11. The data processing apparatus according to claim 10, wherein each W-bit data element comprises W-bits [W−1:0] and each X-bit result data element comprises X-bits [X−1:0]; and
  the $i^{th}$ first stage addition of said W/N first stage additions adds bits [a+N−1:a] of said corresponding W-bit data elements to generate an $i^{th}$ N-bit intermediate value, where $0 \le i \le (W/N-1)$ and a=i*N;
  the $j^{th}$ second stage addition of said X/N second stage additions adds the $j^{th}$ N-bit intermediate value to the rounding value and the carry value representing the carry output of the $(j-1)^{th}$ first stage addition to generate the N-bit result portion comprising bits [c+N−1:c] of the X-bit result data element, where $(W-X)/N \le j \le W/N-1$ and c=j*N.

12. The data processing apparatus according to claim 1, comprising a carry network configured to determine said carry value;
  for at least one second stage addition, said carry network comprises a carry forwarding path for supplying, as said carry value, a carry output of an earlier first stage addition for adding less significant N-bit portions of said corresponding W-bit data elements than said preceding first stage addition.

13. The data processing apparatus according to claim 12, wherein said carry network comprises selection circuitry configured to select whether to supply, as said carry value, the carry output of said preceding first stage addition or the carry output of said earlier first stage addition forwarded on said carry forwarding path.

14. The data processing apparatus according to claim 13, wherein said selection circuitry is configured to select said carry output of said earlier first stage addition if said carry output of said preceding first stage addition is expected to be dependent on, and have the same value as, said carry output of said earlier first stage addition, and otherwise to select said carry output of said preceding first stage addition.

15. The data processing apparatus according to claim 1, wherein for a least significant second stage addition for generating a least-significant N-bit portion of said X-bit result data element, said processing circuitry is configured to generate said rounding value with a value for rounding the X-bit result data element to the nearest X-bit value corresponding to said sum or difference of said corresponding W-bit data elements.

16. The data processing apparatus according to claim 15, wherein said processing circuitry is configured to generate said rounding value with a value corresponding to the value of a most significant excluded bit of said W-bit value, said most significant excluded bit comprising the most significant bit of said W-bit value that does not have a bit of corresponding significance in said nearest X-bit value.

17. The data processing apparatus according to claim 15, wherein said processing circuitry is configured to determine said rounding value for said least significant second stage addition based on at least one of the N-bit intermediate value and the carry output of at least one first stage addition for adding less significant N-bit portions of said corresponding W-bit data elements than the corresponding first stage addition corresponding to said least significant second stage addition.

18. The data processing apparatus according to claim 15, wherein for a more significant second stage addition for generating an N-bit portion of said X-bit result data element that is more significant than said least-significant N-bit portion, said processing circuitry is configured to generate said rounding value with a value representing whether the rounding value added by the least significant second stage addition would cause a carry to propagate through to said more significant second stage addition which would not have occurred if said rounding value was not added by said least significant second stage addition.

19. The data processing apparatus according to claim 18, wherein said processing circuitry is configured to determine said rounding value for said more significant second stage addition based on at least one of the N-bit intermediate value and the carry output of at least one first stage addition without actually propagating said carry from said least significant second stage addition to said more significant second stage addition.

20. A data processing apparatus comprising:
processing means for processing data; and
control means for controlling said processing means to perform a narrowing-and-rounding arithmetic operation in response to a narrowing-and-rounding arithmetic instruction identifying two operands each comprising at least one W-bit data element, said narrowing-and-rounding arithmetic operation generating a result value comprising at least one X-bit result data element, each X-bit result data element representing a sum or difference of corresponding W-bit data elements of said two operands rounded to an X-bit value, where W and X are integers and W>X;
wherein said control means is configured to control said processing means to generate each X-bit result data element of said result value by:

(a) performing a plurality of N-bit first stage additions to generate respective N-bit intermediate values by adding or subtracting N-bit portions of said corresponding W-bit data elements, where W=J*N and J>1 and N and J are integers;
(b) performing one or more N-bit second stage additions, each second stage addition for converting the N-bit intermediate value generated by a corresponding first stage addition into an N-bit rounded result portion of said X-bit result data element by adding a rounding value and a carry value representing a carry output of a preceding first stage addition for adding less significant N-bit portions of said corresponding W-bit data elements than said corresponding first stage addition; and
(c) forming said X-bit result data element from the N-bit result portion generated by at least one of said one or more N-bit second stage additions.

21. A data processing method for a data processing apparatus, comprising:
in response to a narrowing-and-rounding arithmetic instruction identifying two operands each comprising at least one W-bit data element, performing a narrowing-and-rounding operation to generate a result value comprising at least one X-bit result data element, each X-bit result data element representing a sum or difference of corresponding W-bit data elements of said two operands rounded to an X-bit value, where W and X are integers and W>X;
wherein each X-bit result data element is generated by the data processing apparatus:
(a) performing, using a plurality of N-bit first stage adders, a plurality of N-bit first stage additions to generate respective N-bit intermediate values by adding or subtracting N-bit portions of said corresponding W-bit data elements, where W=J*N and J>1 and N and J are integers;
(b) performing, using one or more N-bit second stage adders, one or more N-bit second stage additions, each second stage addition for converting the N-bit intermediate value generated by a corresponding first stage addition into an N-bit rounded result portion of said X-bit result data element by adding a rounding value and a carry value representing a carry output of a preceding first stage addition for adding less significant N-bit portions of said corresponding W-bit data elements than said corresponding first stage addition; and
(c) forming said X-bit result data element from the N-bit result portion generated by at least one of said one or more N-bit second stage additions.

\* \* \* \* \*